June 8, 1954     J. W. RICHARDSON     2,680,625
TANDEM AXLE MOUNTING
Filed July 1, 1953
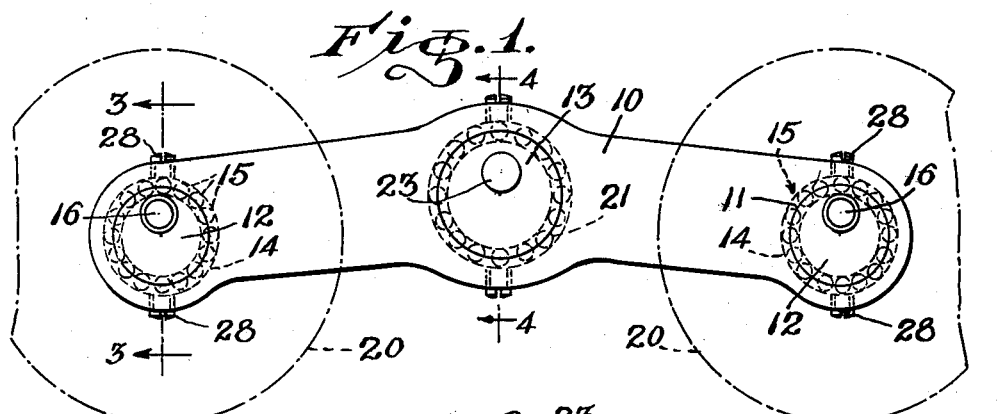
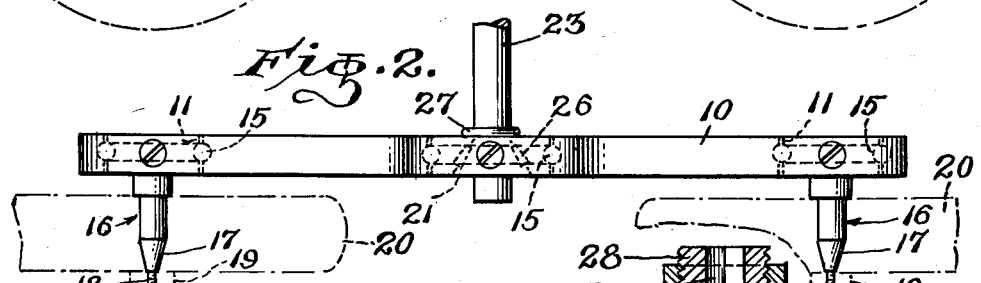
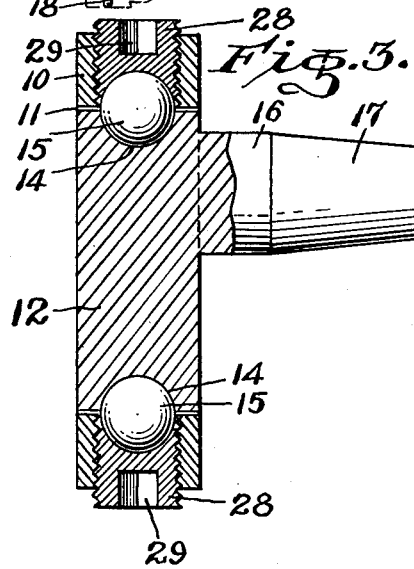
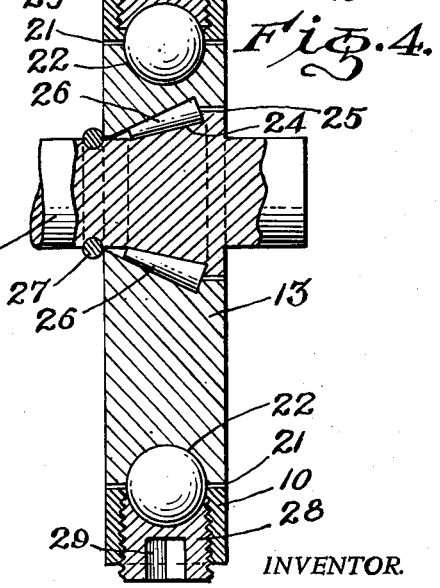
INVENTOR.
John W. Richardson,
BY Victor J. Evans & Co.
ATTORNEYS Patented June 8, 1954

2,680,625

UNITED STATES PATENT OFFICE 2,680,625

TANDEM AXLE MOUNTING

John William Richardson, Houston, Tex.

Application July 1, 1953, Serial No. 365,411

2 Claims. (Cl. 280—104.5)

This invention relates to a vehicle, and more particularly to a vehicle wheel supporting mechanism.

This invention is an improvement over the High Low Trailer Axle Mounting, shown and described in my copending application, Serial No. 321,204.

The object of the invention is to provide a trailer axle mounting which will insure that the trailer or other vehicle will remain level even though the trailer is on uneven ground.

Another object of the invention is to provide an axle mounting which can have any number of wheels attached thereto as desired, and wherein the adjustable mounting of the present invention permits the wheels to travel with a floating action over uneven surfaces or when the vehicle is going around curves.

A further object of the invention is to provide a trailer axle mounting which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the mounting of the present invention.

Figure 2 is a top plan view of the mounting.

Figure 3 is a sectional view taken on the line 3—3 of Figure 1.

Figure 4 is a sectional view taken on the line 4—4 of Figure 1.

Referring in detail to the drawings, the numeral 10 designates a body member which may be made of any suitable material, and the body member 10 is provided with a circular opening or cutout 11 adjacent each end. Rotatably mounted in each of the openings 11 is a plate 12, and the plate 12 is provided with an annular groove 14 for receiving therein balls or ball bearings 15. The opposed portion of the body member 10 is provided with a similar groove for receiving therein the balls 15.

Arranged off center with respect to each of the plates 12 and secured thereto is a stub shaft 16, Figure 3. Each of the stub shafts 16 includes a tapered portion 17 that terminates in a threaded bolt 18. The stub shaft 16 is adapted to have mounted thereon a wheel 20. A suitable nut 19 is adapted to be arranged in engagement with the threaded portion 18 for maintaining the wheel 20 on the stub shaft.

Interposed between the pair of circular openings 11 is a circular opening 21, and the opening 21 rotatably receives therein a circular disc or plate 13. The disc 13 is provided with an annular groove 22 in its outer periphery for receiving therein balls 15, and a corresponding annular groove is arranged in the adjacent portion of the body member 10.

Arranged offset with respect to the disc 10 is an axle 23. The axle 23 includes a flaring or tapered portion 24 which provides a seat for a plurality of tapered bearings 26, there being a shoulder 25 in the disc 13 for maintaining the bearings 26 in their proper place. A split ring 27 is mounted on the axle 23 for maintaining the disc 13 on the axle 23.

A means is provided for permitting access to the ball bearings 15. This means comprises cap screws 28 which are arranged in engagement with the body member 10 as by threading. Each of the cap screws 28 has the same size as the ball bearings 15 so that by removing the proper cap screws 28 the ball bearings 15 can be removed or replaced or lubricated or cleaned as desired.

Each of the cap screws 28 is provided with a socket or recess 29 whereby a suitable tool can be arranged in engagement with the cap screws when they are to be removed or replaced.

From the foregoing it is apparent that a wheel mounting has been provided for supporting a trailer or other vehicle. The off center arrangement of the stub shaft 16 together with the freely rotatable plates 12 insure that the trailer will remain level even though the vehicle is passing over rough ground. For example, as shown in Figure 1, if the rear wheel 20 (that is the wheel 20 shown on the right side) passes over a bump, the stub shaft 16 will be moved 180 degrees so that it is in a lowered position instead of the raised position whereby the trailer will remain level. In the event that the wheel 20 on the right hand side of Figure 1 is passing over a bump and with the stub shaft 16 in the lowered position, the other stub shaft 16 for the wheel 20 on the left side of Figure 1 will remain in the uppermost or raised position in order to maintain the vehicle or trailer level. The plates 12 and 13 are circular in shape and are freely rotatable in the body member 10. In Figures 1 and 2 the complete jackknife is shown assembled. The ball bearings 15 hold the plates in the body member 10 and also permit the plates 12 and 13 to move around so that a rolling floating chamber is provided. This eliminates shock on the axle and insures that the jackknife will readily assume a level position without requiring any adjustments especially on hill sides and hollows. The center disc 13 may either remain free rolling or can remain stationary in any of its positions and the axles and stub shafts are secured as by welding to the various plates.

Also, four wheels can be mounted on a single jackknife or body member and each of the wheels can have a rotatable plate associated therewith. In use, the set of wheels on the inside of the curve start dragging so that they will back-up or climb to the high side of their race to cause the center axle 23 to drop down toward the wheels on the inside of the curve and this causes the load to move towards the curve instead of outward. It is to be noted that the plates 12 and 13 are surrounded by ball bearings so that these plates can rotate in the frame or body member 10, since the ball bearings eliminate or reduce friction between the plates and body member 10. Thus, in the event the vehicle encounters a bump or recess, there will be more friction between the corresponding wheel 20 and the road than there will be between the plates and body member so that the plate will rotate. In other words, the shaft 16 can roll downwardly to allow the wheels to ride holes in the road so that the wheels will ride in and out of the hole or over a bump with perfect ease. Furthermore, brake chatter due to sudden stops will be eliminated. The center axle or trunnion 23 rolls similarly in a circumferential path due to the provision of the ball bearings.

I claim:

1. In a vehicle mounting, a body member provided with a circular opening adjacent each end, there being a circular opening in the center of said body member, a plate rotatably mounted in each of said openings adjacent the ends of the body member, a disc rotatably mounted in the circular opening in the center of the body member, ball bearings interposed between said plates and disc and body member, a stud shaft arranged off center with respect to each of said plates and secured thereto, a wheel mounted on each of said stub shafts, an axle arranged off center with respect to said disc and extending therethrough, and tapered bearings interposed between said disc and axle.

2. The apparatus as described in claim 1, wherein said axle is provided with a tapered portion defining an annular shoulder for receiving said tapered bearings, and cap screws detachably connected to said body member.

References Cited in the file of this patent

UNITED STATES PATENTS

| Number | Name | Date |
|---|---|---|
| 1,925,536 | Judd | Sept. 5, 1933 |
| 2,349,289 | Larison | May 23, 1944 |